(12) United States Patent
Chu et al.

(10) Patent No.: US 11,404,227 B1
(45) Date of Patent: Aug. 2, 2022

(54) KEYBOARD DEVICE

(71) Applicant: Primax Electronics Ltd., Taipei (TW)

(72) Inventors: Chun-Lin Chu, Taipei (TW); Sheng-An Tsai, Taipei (TW); Hsiang-Yu Ou, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 17/361,987

(22) Filed: Jun. 29, 2021

(30) Foreign Application Priority Data

May 7, 2021 (TW) .................................. 110116499

(51) Int. Cl.
*H01H 13/04* (2006.01)
*H01H 13/705* (2006.01)

(52) U.S. Cl.
CPC ........... *H01H 13/04* (2013.01); *H01H 13/705* (2013.01)

(58) Field of Classification Search
CPC ................. H01H 13/04; H01H 13/705; H01H 2217/028; H01H 2227/036; H01H 2217/034; H01H 3/125; H01H 13/14; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20; G06F 3/0208; G06F 3/0219; G06F 1/1616; G06F 1/166; G06F 3/0202; G06F 3/0213
See application file for complete search history.

(56) References Cited

U.S. PATENT DOCUMENTS

| 6,682,240 B1 * | 1/2004 | Chou | G06F 3/0208 248/188.8 |
| 7,815,381 B2 * | 10/2010 | Monney | G06F 3/0213 400/479 |
| 2013/0161479 A1 * | 6/2013 | Yu | G06F 3/0208 248/685 |
| 2020/0225701 A1 * | 7/2020 | Tsao | G06F 1/203 |

* cited by examiner

*Primary Examiner* — Ahmed M Saeed
(74) *Attorney, Agent, or Firm* — Kirton McConkie; Evan R. Witt (57) ABSTRACT

A keyboard device includes a casing and at least one supporting leg. The supporting leg includes a first supporting part, a second supporting part and a pivotal shaft. The supporting leg is pivotally coupled to an accommodation space of the casing through the pivotal shaft. The pivotal shaft is rotatable relative to the casing. Consequently, the supporting leg can be switched between a stored state and a supporting state. When the supporting leg is in the stored state, the supporting leg is accommodated within the accommodation space, and the accommodation space is covered by the first supporting part and the second supporting part. While the supporting leg is switched from the stored state to the supporting state, the first supporting part is pushed into the accommodation space in response to an external force, and the second supporting part is correspondingly moved away from the accommodation space.

8 Claims, 8 Drawing Sheets

KEYBOARD DEVICE

FIELD OF THE INVENTION

The present invention relates to an input device, and more particularly to a keyboard device with a supporting leg.

BACKGROUND OF THE INVENTION

With increasing development of science and technology, a variety of electronic devices are designed in views of convenience and user-friendliness. For helping the user well operate the electronic devices, the electronic devices are gradually developed in views of humanization. The input devices of the common electronic devices include for example mouse devices, keyboard devices, trackball devices, or the like. Via the keyboard device, characters or symbols can be inputted into the computer system directly. As a consequence, most users and most manufacturers of input devices pay much attention to the development of keyboard devices.

Nowadays, the bottom side of the commercially available keyboard device is usually equipped with a supporting leg. Since the supporting leg is pivotally coupled to the bottom side of the keyboard device, the supporting leg can be rotated relative to the keyboard device and selectively switched between a stored state and a supporting state. Consequently, the tilt degree of the keyboard device is adjustable, and the hand joints of the user are placed at a more comfortable angle when the keyboard device is operated. In this way, the improper force exerted on the hand joints and the muscles is reduced, the and risk of getting injuries on the hand joints and the muscles will be effectively reduced.

Figure 1:
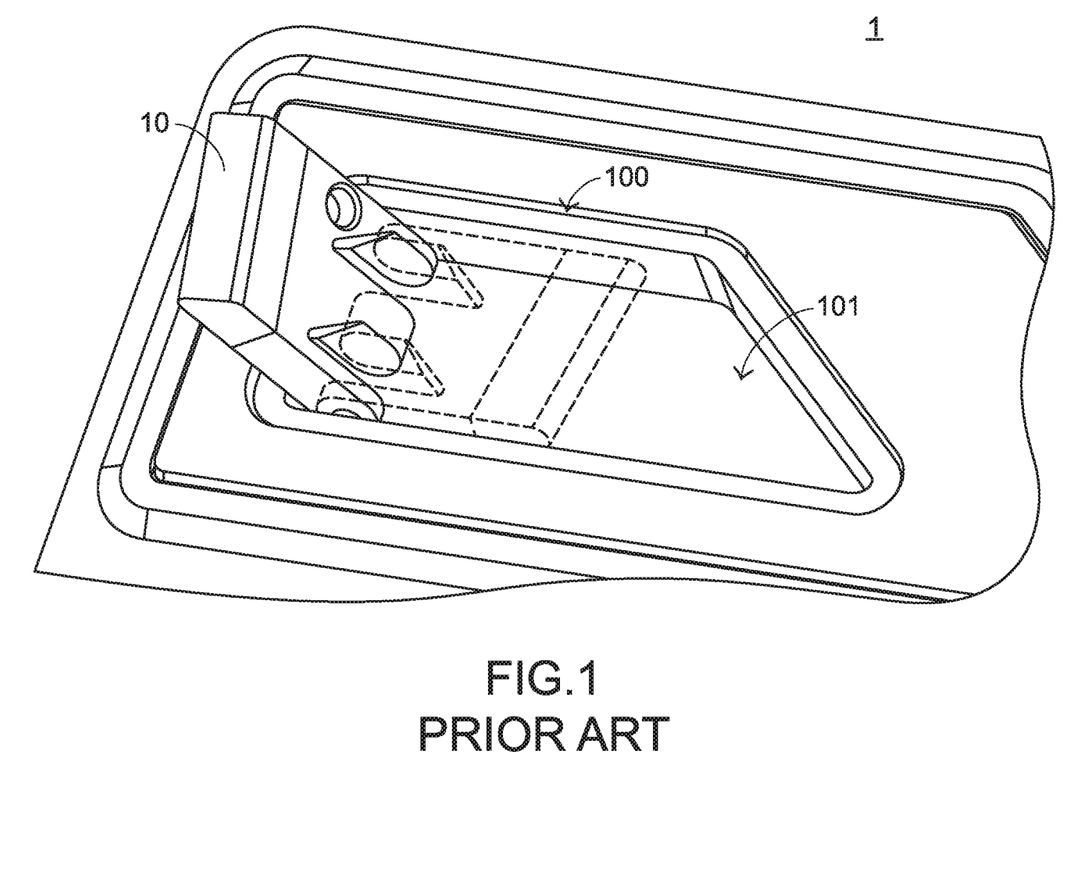
FIG. 1 is a schematic perspective view illustrating a portion of a conventional keyboard device with a supporting leg.

FIG. 1 is a schematic perspective view illustrating a portion of a conventional keyboard device with a supporting leg. As shown in FIG. 1, an accommodation space 100 is concavely formed in the bottom side of the conventional keyboard device 1. In addition, the supporting leg 10 is pivotally coupled to the accommodation space 100. In the stored state, the supporting leg 10 is stored in the accommodation space 100. While the state of the supporting leg 10 is switched from the stored state to the supporting state, the supporting leg 10 is rotated relative to the keyboard device 1 and protruded out of the accommodation space 100. Moreover, the conventional keyboard device 1 further comprises a finger-receiving recess 101, which is in communication with the accommodation space 100. The finger-receiving recess 101 is located at a distal end of the supporting leg 100. The user can insert a finger into the finger-receiving recess 101 to pull the supporting leg 100. However, the finger-receiving recess 101 connected with the accommodation space 100 adversely affects the appearance of the keyboard device 1. For example, when the supporting leg is stored in the accommodation space 100, the appearance of the keyboard device 1 seems to have a broken hole because of the arrangement of the finger-receiving recess 101.

Therefore, there is a need of providing an improved keyboard device in order to overcome the drawbacks of the conventional technologies.

SUMMARY OF THE INVENTION

An object of the present invention provides a keyboard device with a supporting leg. The supporting leg is pivotally coupled to an inner portion of an accommodation space and switched between a stored state and a supporting state. In the stored state, the accommodation space is covered by the supporting leg. Since appearance of the keyboard device does not have the obvious broken hole, the appearance is more aesthetically-pleasing.

The other objects and advantages of the present invention will be understood from the disclosed technical features.

In accordance with an aspect of the present invention, a keyboard device is provided. The keyboard device includes a casing and at least one supporting leg. The casing includes at least one accommodation space. Each supporting leg includes a first supporting part, a second supporting part and a pivotal shaft. The pivotal shaft is arranged between the first supporting part and the second supporting part. The at least one supporting leg is pivotally coupled to an inner portion of the at least one accommodation space through the pivotal shaft. In addition, the pivotal shaft is rotatable relative to the casing. Consequently, the supporting leg is permitted to be switched between a stored state and a supporting state. When the supporting leg is in the stored state, the at least one supporting leg is accommodated within the accommodation space, and the at least one accommodation space is covered by the first supporting part and the second supporting part. While the supporting leg is switched from the stored state to the supporting state, the first supporting part is pushed into the at least one accommodation space in response to an external force, and the second supporting part is correspondingly moved in a direction away from the accommodation space.

In an embodiment, the first supporting part is extended in a first direction away from the pivotal shaft, and the first supporting part has a first length. The second supporting part is extended in a second direction away from the pivotal shaft, and the second supporting part has a second length. The first direction and the second direction are different. The first length is shorter than the second length.

In an embodiment, each of the at least one accommodation space includes a curved inner wall. While the supporting leg is switched from the stored state to the supporting state, the first supporting part is moved in at least one accommodation space along the curved inner wall in response to the external force.

In an embodiment, the casing includes an upper cover and a lower cover, which are combined with each other. The upper cover is equipped with plural key structures. The at least one accommodation space is concavely formed in the lower cover.

In an embodiment, the lower cover includes a first bottom surface, a second bottom surface and an inclined surface. The inclined surface is connected between the first bottom surface and the second bottom surface. When the keyboard device is placed on a reference plane, the first bottom surface and the second bottom surface of the lower cover are in parallel with the reference plane, and there is an angle between the inclined surface of the lower cover and the reference plane.

In an embodiment, the first supporting part includes a first surface, and the second supporting part includes a second surface. When the supporting leg is in the stored state, the accommodation space is covered by the first supporting part and the second support part, the first surface of the first supporting part and the first bottom surface of the lower cover are coplanar with each other, and the second surface of the second supporting part and the inclined surface of the lower cover are coplanar with each other.

In an embodiment, the keyboard device further includes a recognition structure, and the recognition structure is installed on the first surface of the first supporting part.

In an embodiment, the second supporting part further includes a contact surface, which is located adjacent to the second surface. When the supporting leg is in the stored state, the contact surface faces the inner portion of the at least one accommodation space. When the supporting leg is in the supporting state, the contact surface faces the reference plane.

In an embodiment, the keyboard device further includes a buffering pad, and the second supporting part further includes a recess. The recess is concavely formed in the second support part from the contact surface. The buffering pad is installed in the recess. A part of the buffering pad is protruded out of the recess.

From the above descriptions, the present invention provides the keyboard device. The actions of the supporting leg are very simple. By pushing the first supporting part into the accommodation space, the second supporting part can be easily moved in the direction away from the accommodation space. Consequently, the state of the supporting leg is switched from the stored state to the supporting state. In comparison with the conventional technology, the keyboard device does not need to provide an additional finger-receiving recess for allowing the finger to be inserted into the finger-receiving recess to pull the supporting leg. Moreover, when the supporting leg is in the stored state, the supporting leg is accommodated within the accommodation space and not exposed outside the casing. Meanwhile, the entire of accommodation space is supported by the first supporting part and the second supporting part of the supporting leg, and the surfaces of the first supporting part and the second supporting part are coplanar with the surface of the casing. Since the keyboard device is not equipped with the additional finger-receiving recess, the keyboard device has the flat appearance. Since appearance of the keyboard device does not have the obvious broken hole, the appearance is more aesthetically-pleasing.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 2:
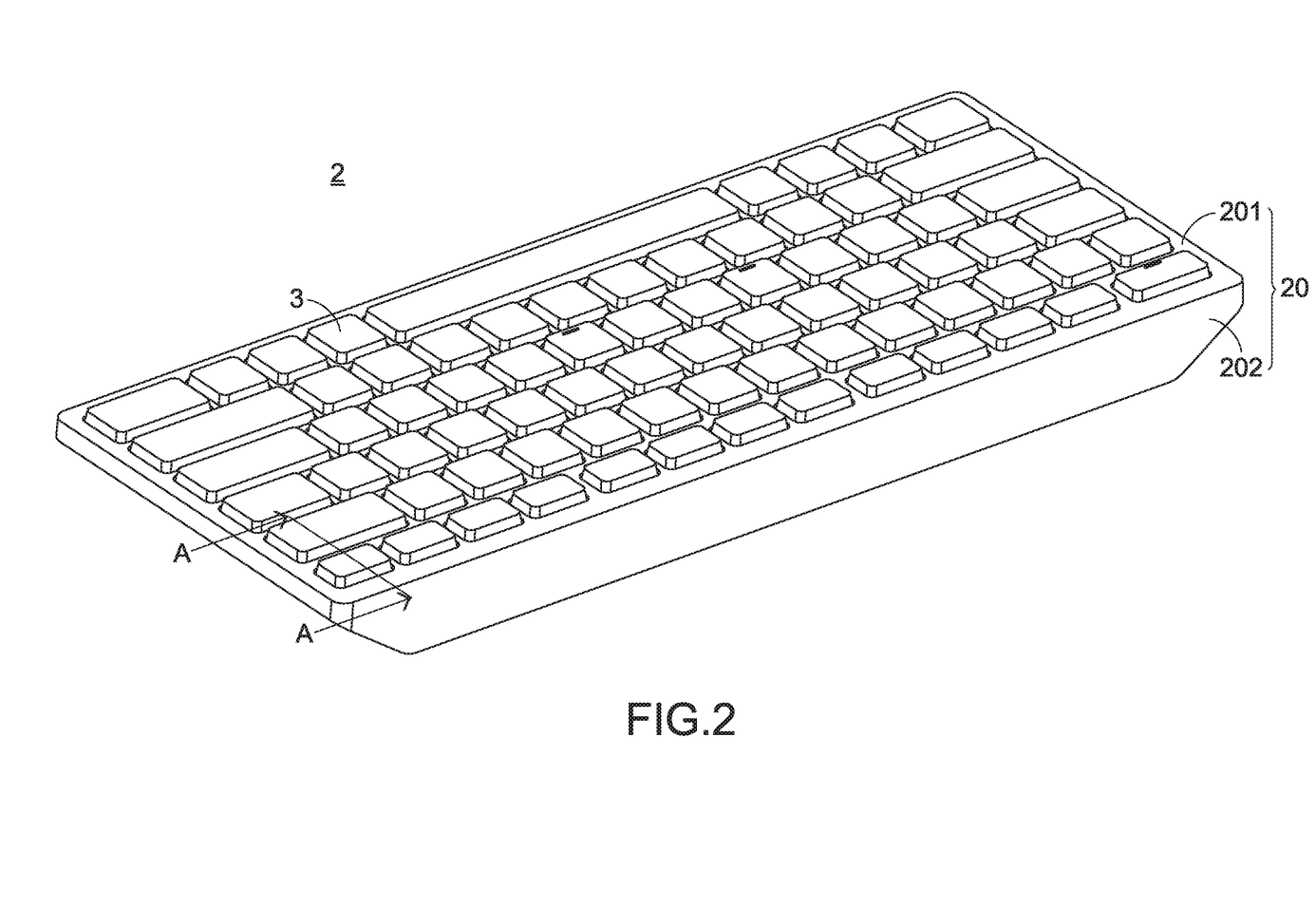
FIG. 2 is a schematic perspective view illustrating the appearance of a keyboard device according to an embodiment of the present invention.
Figure 3:
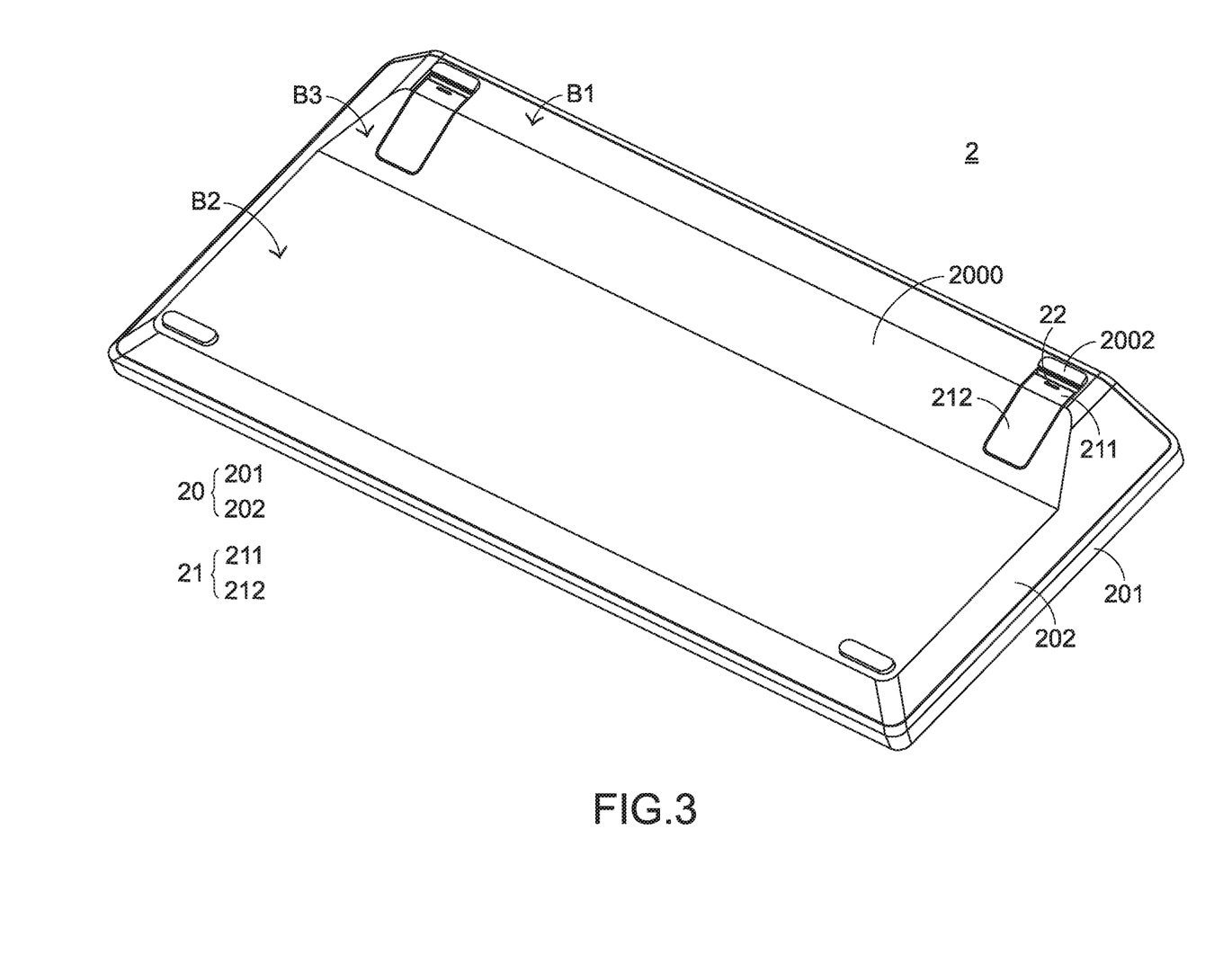
FIG. 3 is a schematic perspective view illustrating the appearance of the keyboard device as shown in FIG. 2 and taken along another viewpoint.
Figure 4:
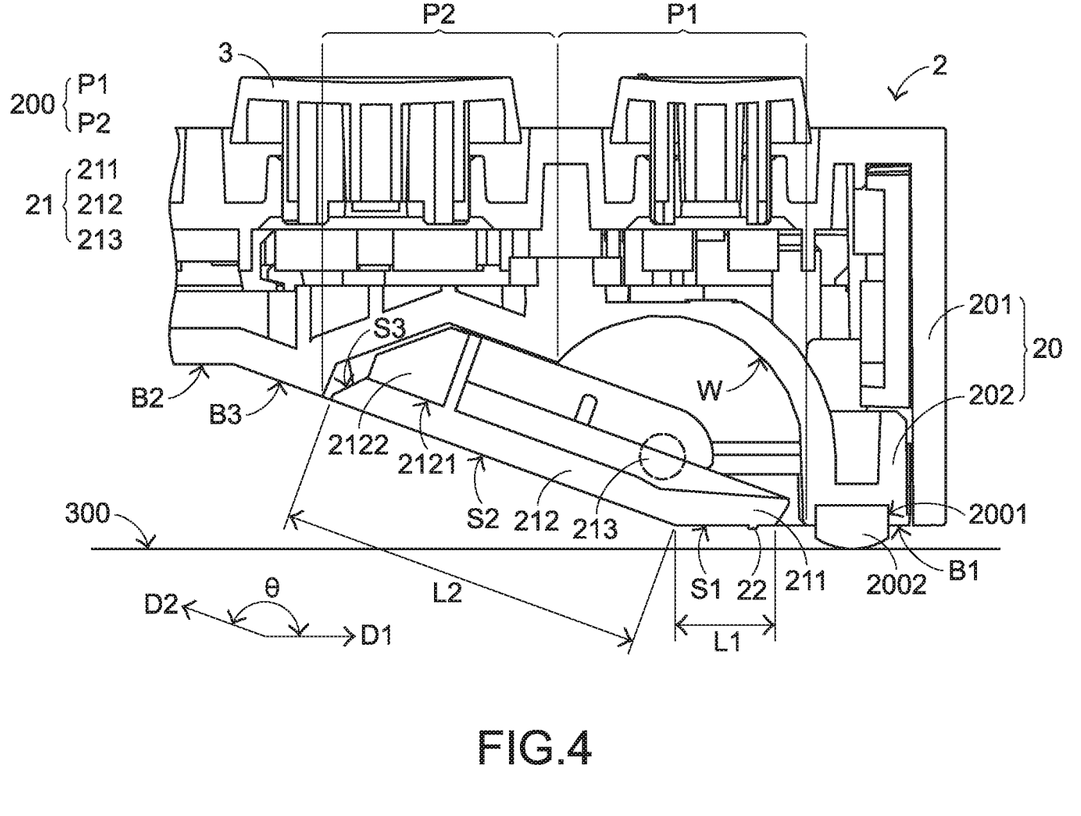
FIG. 4 is a schematic cross-sectional view illustrating the keyboard device as shown in FIG. 2 and taken along the line AA.
Figure 5:
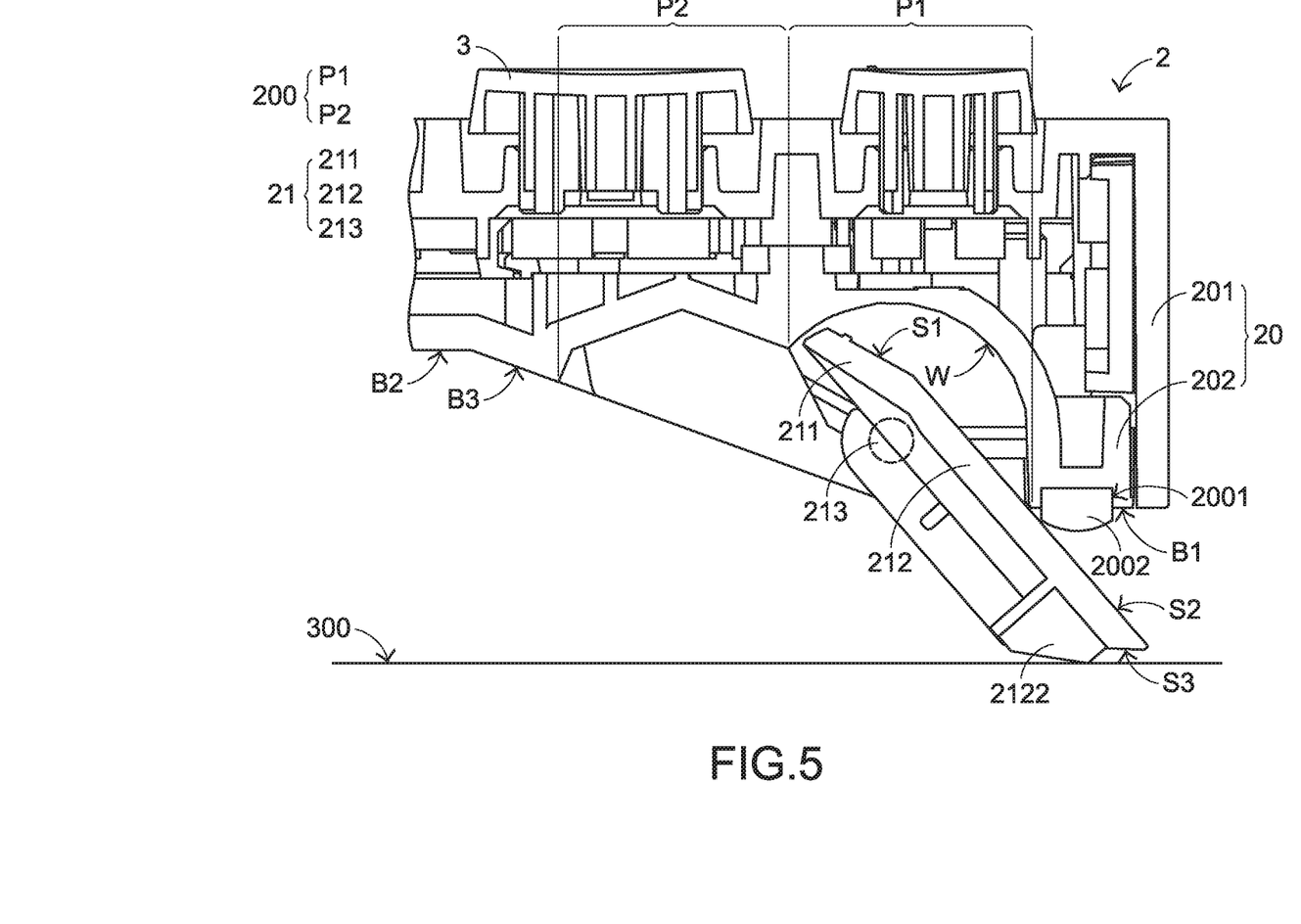
FIG. 5 is a schematic cross-sectional view illustrating the keyboard device as shown in FIG. 4 when the supporting leg is in a supporting state.

Please refer to FIGS. 2 to 5. FIG. 2 is a schematic perspective view illustrating the appearance of a keyboard device according to an embodiment of the present invention. FIG. 3 is a schematic perspective view illustrating the appearance of the keyboard device as shown in FIG. 2 and taken along another viewpoint. FIG. 4 is a schematic cross-sectional view illustrating the keyboard device as shown in FIG. 2 and taken along the line AA. FIG. 5 is a schematic cross-sectional view illustrating the keyboard device as shown in FIG. 4 when the supporting leg is in a supporting state.

As shown in FIGS. 2 to 5, the keyboard device 2 comprises a casing 20 and at least one supporting leg 21. The casing 20 comprises at least one accommodation space 200. The supporting leg 21 comprises a first supporting part 211, a second supporting part 212 and a pivotal shaft 213. The pivotal shaft 213 is arranged between the first supporting part 211 and the second supporting part 212. Particularly, the first supporting part 211 and the second supporting part 212 of the supporting leg 21 are connected with each other and collaboratively formed as a one-piece structure. The pivotal shaft 213 is located at the junction between the first supporting part 211 and the second supporting part 212. The supporting leg 21 is pivotally coupled to the inner portion of the accommodation space 200 through the pivotal shaft 213. The supporting leg 21 is rotated relative to the casing 20 through the pivotal shaft 213. Consequently, the state of the supporting leg 21 can be switched between a stored state and a supporting state. When the supporting leg 21 is in the stored state, the accommodation space 200 of the casing 20 is covered by the first supporting part 211 and the second supporting part 212.

The structure of the supporting leg 21 will be described in more details as follows.

Please refer to FIGS. 2 to 5 again. The first supporting part 211 of the supporting leg 21 is extended in a first direction D1 away from the pivotal shaft 213, and the first supporting part 211 has a first length L1. The second supporting part 212 of the supporting leg 21 is extended in a second direction D2 away from the pivotal shaft 213, and the second supporting part 212 has a second length L2. In this embodiment, the extending direction of the first supporting part 211 (i.e., the first direction D1) and the extending direction of the second supporting part 212 (i.e., the second direction D2) are two different directions. That is, there is an angle θ between the extending direction of the first supporting part 211 (i.e., the first direction D1) and the extending direction of the second supporting part 212 (i.e., the second direction D2). In addition, the first length L1 of the first supporting part 211 is shorter than the second length L2 of the second supporting part 212.

Please refer to FIGS. 2 to 5. The casing 20 comprises an upper cover 201 and a lower cover 202, which are combined with each other. The upper cover 201 of the casing 20 is equipped with plural key structures 3. These key structures 3 are classified into some types, e.g., ordinary keys, numeric keys and function keys. When one of the key structures 3 is depressed by the user's finger, the keyboard device generates a corresponding key signal to a computer (not show), and thus the computer executes a function corresponding to the depressed key structure. At least one accommodation space 200 is concavely formed in the lower cover 202. In this embodiment, the at least one supporting leg 21 comprises two supporting legs, and the at least one accommodation space 200 comprises two accommodation spaces. For example, these two accommodation spaces 200 are concavely formed in two opposite sides of the lower cover 202. It is noted that the locations of the accommodation spaces 200 are not restricted. These two supporting legs 21 are pivotally coupled to the inner portion of the corresponding accommodation spaces 200, respectively.

Please refer to FIGS. 2 to 5 again. The lower cover 202 of the casing 20 comprises a first bottom surface B1, a second bottom surface B2 and an inclined surface B3. The inclined surface B3 is connected between the first bottom surface B1 and the second bottom surface B2. When the keyboard device 2 is placed on a reference plane 300 (e.g., a table), the first bottom B1 and the second bottom B2 of the lower cover 202 are in parallel with the reference plane 300, and there is angle between the inclined surface B3 of the lower cover 202 and the reference plane 300. Due to the relationships between the bottom surface B1, the second bottom surface B2 and the inclined surface B3, a raised platform 2000 is formed on the bottom cover 202 (see FIG. 3). When the supporting leg 21 is in the non-usage state (i.e., the stored state as shown in FIG. 4), the raised platform 2000 of the lower cover 202 can actually achieve the function of supporting the keyboard device 2. In this embodiment, the first bottom surface B1 of the lower cover 202 (i.e., the bottom surface of the raised platform 2000) has a recess 2001. Moreover, a buffering pad 2002 is installed in the corresponding recess 2001, and a part of the buffering pad 2002 is protruded out of the recess 2001. When the keyboard device 2 is supported on the reference plane 300 through the raised platform 2000, the buffering pad 200 is contacted with the reference plane 300 to prevent the first bottom surface B1 from directly colliding with the reference plane 300 and causing the cracked damage of the raised platform 2000.

In the above embodiment, the lower cover 202 of the casing 20 is equipped with the raised platform 2000. It is noted that numerous modifications and alterations may be made while retaining the teachings of the invention. In another embodiment, the lower cover 202 of the casing 20 is a plane structure without the raised platform 2000. In the case that the lower cover 202 of the casing 20 is equipped with the raised platform 2000, the recess 2001 is formed in first bottom surface B1 of the lower cover 202, and the buffering pad 2002 is installed in the recess 2001. It is noted that numerous modifications and alterations may be made while retaining the teachings of the invention. In another embodiment, the first bottom surface B1 of the lower cover 202 is not equipped with the recess 2001 and the buffering pad 2002. That is, the first bottom surface B1 is directly contacted with the reference plane 300.

Please refer to FIGS. 2 to 5 again. The first supporting part 211 of the supporting leg 21 comprises a first surface S1. The second supporting part 212 of the supporting leg 21 comprises a second surface S2. When the supporting leg 21 is in the stored state as shown in FIG. 4, the accommodation space 200 of the casing 20 is covered by the first supporting part 211 and the second support part 212. In addition, the first surface S1 of the first supporting part 211 and the first bottom surface B1 of the lower cover 202 are coplanar with each other, and the second surface S2 of the second supporting part 212 and the inclined surface B3 of the lower cover 202 are coplanar with each other. Due to this structural design, when the supporting leg 21 is in the stored state, the keyboard device 2 has a flat appearance. Consequently, the appearance of the keyboard device 2 is aesthetically-pleasing.

Please refer to FIGS. 2 to 5 again. The second supporting part 212 of the supporting leg 21 further comprises a contact surface S3, which is located adjacent to the second surface S2. When the supporting leg 21 is in the stored state as shown in FIG. 4, the contact surface S3 of the second supporting part 212 faces the inner portion of the accommodation space 200 of the casing 20. When the supporting leg 21 is in the supporting state as shown in FIG. 5, the contact surface S3 of the second supporting part 212 faces the reference plane 300. Moreover, in this embodiment, the second supporting part 212 further comprises a recess 2121. The recess 2121 is concavely formed in the second support part 212 from the contact surface S3. A buffering pad 2122 is installed in the recess 2121, and a part of the buffering pad 2122 is protruded out of the recess 2121. When the keyboard 2 is supported on the reference plane 300 through the supporting leg 21, the buffering pad 2122 on the second support part 212 is contacted with the reference plane 300 in advance in order to prevent the contact surface S3 from directly colliding with the reference plane 300 and causing the cracked damage of the supporting leg 21.

In the above embodiment, the contact surface S3 of the second support part 212 is equipped with the recess 2121, and the buffering pad 2122 is installed in the recess 2121. It is noted that numerous modifications and alterations may be made while retaining the teachings of the invention. In another embodiment, the contact surface S3 of the second support part 212 is not equipped with the recess 2121 and the buffering pad 2122. In other words, the contact surface S3 of the second support part 212 is directly contacted with the reference plane 300.

Figure 6A:
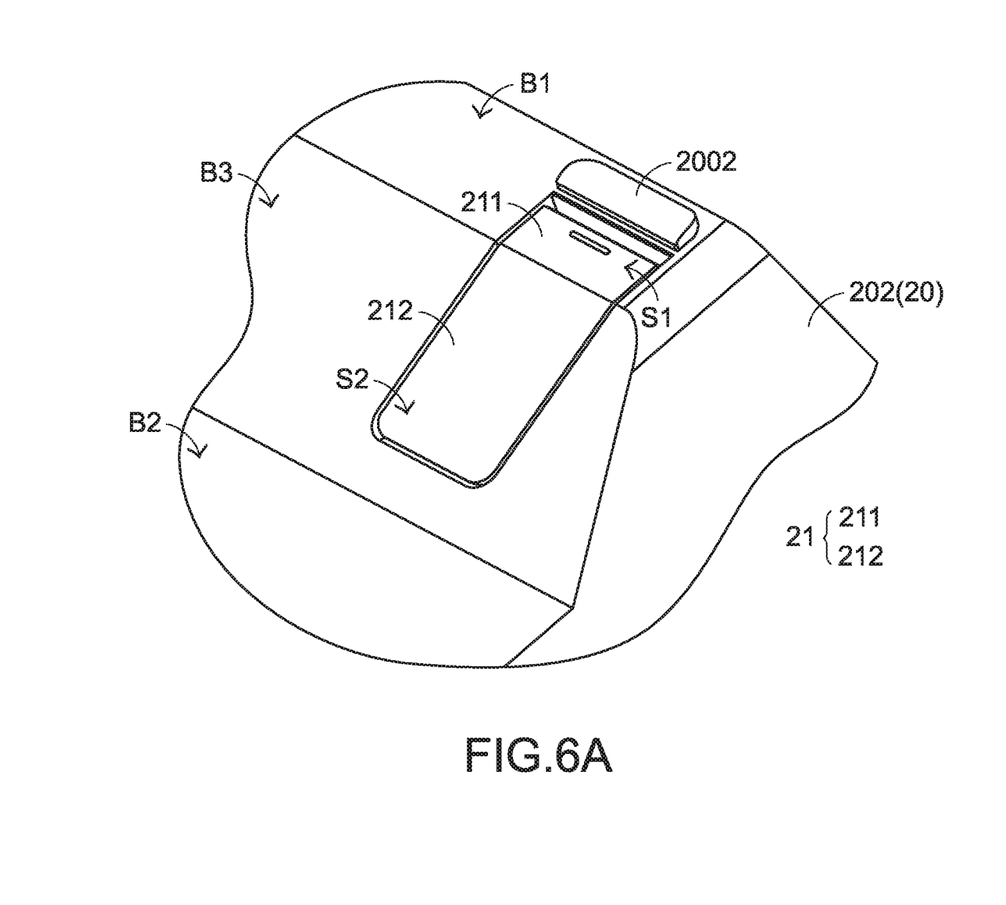
FIGS. 6A, 6B and 6C schematically illustrate the actions of the supporting leg according to the embodiment of the present invention.
Figure 6B:
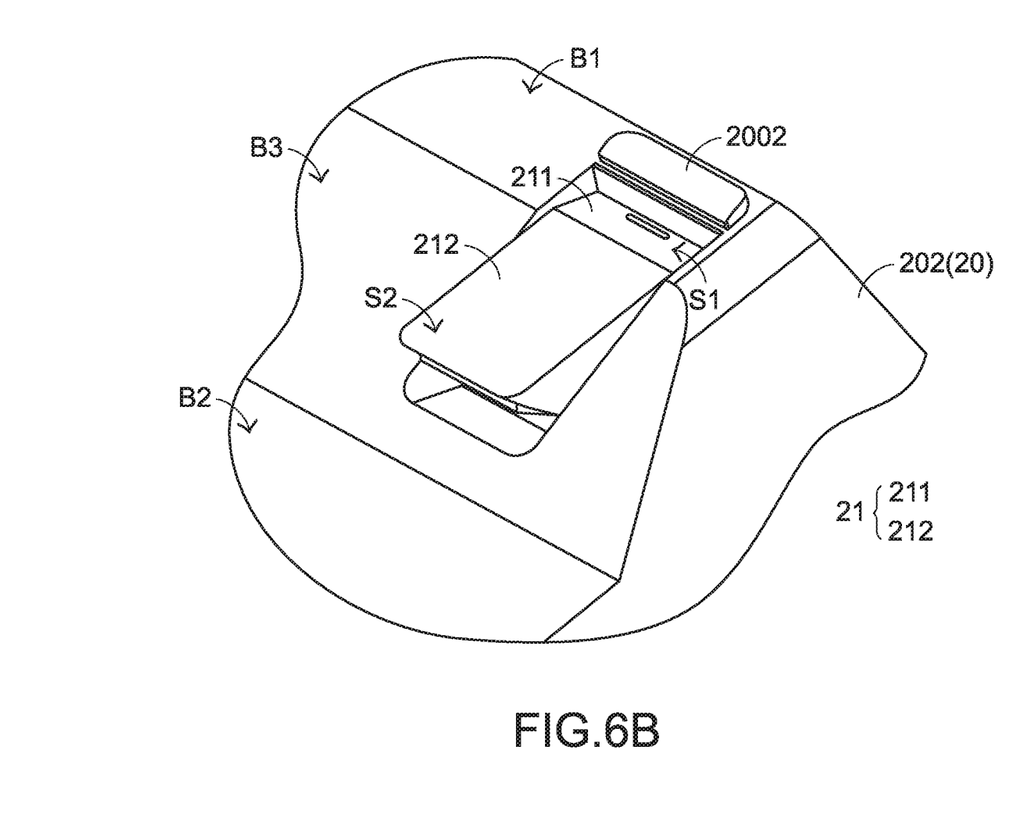
Figure 6C:
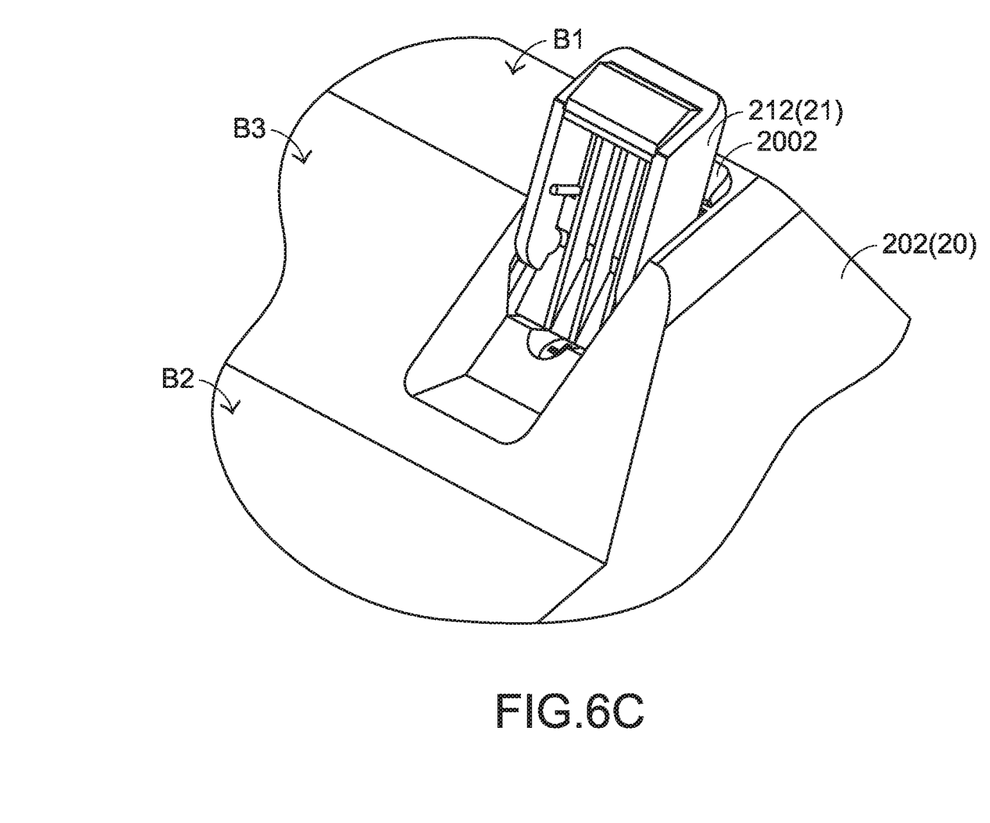

FIGS. 6A, 6B and 6C schematically illustrate the actions of the supporting leg according to the embodiment of the present invention. Please also refer to FIGS. 4 and 5. Firstly, as shown in FIG. 6A, the supporting leg 21 is in the stored state. The supporting leg 21 is installed in the accommodation space 200 of the casing 20. The accommodation space 200 of the casing 20 are covered by the first supporting part 211 and the second supporting part 212. In other words, the first surface S1 of the supporting part 211 and the second bottom surface B1 of the lower cover 202 are coplanar with each other, and the second surface S2 of the second supporting part 212 and the inclined surface B3 of the lower cover 202 are coplanar with each other.

Please refer to FIG. 6B. While the supporting leg 21 is switched from the stored state to the supporting state, the first supporting part 211 of the supporting leg 21 is pushed into the accommodation space 200 of the casing 20 in response to an external force. As the first supporting part 211 is pushed into the accommodation space 200, the second supporting part 212 is correspondingly moved away from the accommodation space 200. Consequently, the supporting leg 21 is switched to the supporting state as shown in the FIG. 6C. Particularly, the accommodation space 200 of the casing 20 comprises a first section P1 and a second section P2, which are in communication with each other. As shown in FIGS. 4 and 5, the first section P1 of the accommodation space 200 comprises a curved inner wall W. While the supporting leg 21 is switched from the stored state to the supporting state, the first supporting part 211 is moved in the accommodation space 200 along the curved inner wall W.

In an embodiment, the space size of the first section P1 of the accommodation space 200 is designed according to the first length L1 of the first supporting part 211. In case that the first length L1 of the first supporting part 211 is shorter than the second length L2 of the second supporting part 212, the space size of the first section P1 of the accommodation space 200 is largely reduced, and thus the cost is effectively reduced.

In this embodiment, the keyboard device 2 further comprises a recognition structure 22. The recognition structure 22 is installed on the first surface S1 of the first supporting part 211. The user can recognize the location of the first supporting part 211 according to the recognition structure 22. Consequently, in response to the pushing action of the user, the first supporting part 211 can be moved in the accommodation space 200, and the second supporting part 212 is correspondingly moved in the direction away from the accommodation space 200. Consequently, the supporting leg 21 is switched to the supporting state as shown in FIG. 6C. In this embodiment, an example of the recognition structure 22 is an elongated bulge. However, the appearance and shape of the recognition structure 22 are not restricted.

There are two method of switching the state of the supporting leg 21 from the stored state to the supporting state. In accordance with the first method, the first supporting part 211 is pushed by the user, and thus the second supporting part 212 is moved to the supporting state as shown in FIG. 6C. In accordance with the second method, the first supporting part 211 is firstly pushed by the user, and thus the second supporting part 212 is correspondingly moved away from the accommodation space 200 (i.e., in the situation of FIG. 6B). Then, the second supporting part 212 is pushed by the user, and thus the first supporting part 211 is corresponding to the position as shown in FIG. 6C.

From the above descriptions, the present invention provides the keyboard device. The actions of the supporting leg are very simple. By pushing the first supporting part into the accommodation space, the second supporting part can be easily moved in the direction away from the accommodation space. Consequently, the state of the supporting leg is switched from the stored state to the supporting state. In comparison with the conventional technology, the keyboard device does not need to provide an additional finger-receiving recess for allowing the finger to be inserted into the finger-receiving recess to pull the supporting leg. Moreover, when the supporting leg is in the stored state, the supporting leg is accommodated within the accommodation space and not exposed outside the casing. Meanwhile, the entire of accommodation space is supported by the first supporting part and the second supporting part of the supporting leg, and the surfaces of the first supporting part and the second supporting part are coplanar with the surface of the casing. Since the keyboard device is not equipped with the additional finger-receiving recess, the keyboard device has the flat appearance. Since appearance of the keyboard device does not have the obvious broken hole, the appearance is more aesthetically-pleasing.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A keyboard device, comprising: a casing comprising at least one accommodation space; and at least one supporting leg, wherein each supporting leg comprises a first supporting part, a second supporting part and a pivotal shaft, and the pivotal shaft is arranged between the first supporting part and the second supporting part, wherein the at least one supporting leg is pivotally coupled to an inner portion of the at least one accommodation space through the pivotal shaft, and the pivotal shaft is rotatable relative to the casing, so that the supporting leg is permitted to be switched between a stored state and a supporting state, wherein when the supporting leg is in the stored state, the at least one supporting leg is accommodated within the accommodation space, and the at least one accommodation space is covered by the first supporting part and the second supporting part, wherein while the supporting leg is switched from the stored state to the supporting state, the first supporting part is pushed into the at least one accommodation space in response to an external force, and the second supporting part is correspondingly moved in a direction away from the accommodation space; wherein the first supporting part is extended in a first direction away from the pivotal shaft, and the first supporting part has a first length, wherein the second supporting part is extended in a second direction away from the pivotal shaft, and the second supporting part has a second length, wherein the first direction and the second direction are different, and the first length is shorter than the second length.

2. The keyboard device according to claim 1, wherein each of the at least one accommodation space comprises a curved inner wall, wherein while the supporting leg is switched from the stored state to the supporting state, the first supporting part is moved in at least one accommodation space along the curved inner wall in response to the external force.

3. The keyboard device according to claim 1, wherein the casing comprises an upper cover and a lower cover, which are combined with each other, wherein the upper cover is equipped with plural key structures, and the at least one accommodation space is concavely formed in the lower cover.

4. The keyboard device according to claim 3, wherein the lower cover comprises a first bottom surface, a second bottom surface and an inclined surface, wherein the inclined surface is connected between the first bottom surface and the second bottom surface, wherein when the keyboard device is placed on a reference plane, the first bottom surface and the second bottom surface of the lower cover are in parallel with the reference plane, and there is an angle between the inclined surface of the lower cover and the reference plane.

5. The keyboard device according to claim 4, wherein the first supporting part comprises a first surface, and the second supporting part comprises a second surface, wherein when the supporting leg is in the stored state, the accommodation space is covered by the first supporting part and the second support part, the first surface of the first supporting part and the first bottom surface of the lower cover are coplanar with each other, and the second surface of the second supporting part and the inclined surface of the lower cover are coplanar with each other.

6. The keyboard device according to claim 5, wherein the keyboard device further comprises a recognition structure, and the recognition structure is installed on the first surface of the first supporting part.

7. The keyboard device according to claim 5, wherein the second supporting part further comprises a contact surface, which is located adjacent to the second surface, wherein when the supporting leg is in the stored state, the contact surface faces the inner portion of the at least one accommodation space, wherein when the supporting leg is in the supporting state, the contact surface faces the reference plane.

8. The keyboard device according to claim 7, wherein the keyboard device further comprises a buffering pad, and the second supporting part further comprises a recess, wherein the recess is concavely formed in the second support part from the contact surface, the buffering pad is installed in the recess, and a part of the buffering pad is protruded out of the recess.

* * * * *